(12) United States Patent
Lu

(10) Patent No.: US 11,956,668 B2
(45) Date of Patent: Apr. 9, 2024

(54) DUPLICATED DATA-BASED TRANSMISSION METHOD AND RELATED DEVICES

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICAIONS CORP., LTD., Dongguan (CN)

( * ) Notice: Subject to any disclaimer, the term of this patent is extended or adjusted under 35 U.S.C. 154(b) by 374 days.

(21) Appl. No.: 17/219,193

(22) Filed: Mar. 31, 2021

(65) Prior Publication Data
US 2021/0219177 A1 Jul. 15, 2021

Related U.S. Application Data

(63) Continuation of application No. PCT/CN2018/112771, filed on Oct. 30, 2018.

(51) Int. Cl.
*H04W 28/06* (2009.01)
*H04W 76/15* (2018.01)
*H04W 76/27* (2018.01)
*H04W 80/02* (2009.01)
*H04W 84/18* (2009.01)

(52) U.S. Cl.
CPC .......... *H04W 28/06* (2013.01); *H04W 76/15* (2018.02); *H04W 76/27* (2018.02); *H04W 80/02* (2013.01); *H04W 84/18* (2013.01)

(58) Field of Classification Search
None
See application file for complete search history.

(56) References Cited

U.S. PATENT DOCUMENTS

2018/0367288 A1* 12/2018 Vrzic .................... H04W 36/22
2019/0386779 A1    12/2019 Hong et al.
2019/0387561 A1* 12/2019 Paladugu .............. H04W 76/15
(Continued)

FOREIGN PATENT DOCUMENTS

| CN | 103201977 A | 7/2013 |
|---|---|---|
| CN | 108401484 A | 8/2018 |
| CN | 201811268713 | * 10/2018 |

(Continued)

OTHER PUBLICATIONS

Author Unknown, R2-1912720—UE based PDCP duplication activation/deactivation, pp. 1-5, Oct. 18, 2018.*

(Continued)

*Primary Examiner* — Christopher M Crutchfield
(74) *Attorney, Agent, or Firm* — Young Basile Hanlon & MacFarlane, P.C.

(57) ABSTRACT

A duplicated data-based transmission method and related devices are provided. The method is applicable to a scenario where there are duplicated data under both dual connectivity (DC) and carrier aggregation (CA). The method includes the following. A first communication device receives first information sent by a second communication device, where the first information is used for determining information of at least three radio link control (RLC) entities corresponding to a packet data convergence protocol (PDCP) entity.

12 Claims, 5 Drawing Sheets

(56) References Cited

U.S. PATENT DOCUMENTS

2020/0163140 A1* 5/2020 Mochizuki .............. H04L 5/001
2021/0400529 A1* 12/2021 Wang ........................ H04L 1/08

FOREIGN PATENT DOCUMENTS

KR        20180106880 A     10/2018
WO        2018143600 A1      8/2018

OTHER PUBLICATIONS

Author Unknown, R2-1912499—Discussion on UE Autonomous PDCP Duplication, pp. 1-2, Oct. 18, 2019.*
Author Unknown, R3-185879—Discussion on support for PDCP Duplication with More than 2 Copies, pp. 1-2, Oct. 12, 2018.*
Author Unknown, R2-1913639—Value of UE-based PDCP duplication, pp. 1-4, Oct. 12, 2018.*
ZTE, Initial consideration on URLLC duplication enhancement, 3GPP TSG-RAN WG3 #101bis, R3-185577 mailed Oct. 8-12, 2018. (4 pages).
CATT, Duplication Activation/Deactivation MAC CE, 3GPP TSG-RAN WG2 #99, R2-1707921 mailed Aug. 21-25, 2017. (5 pages).
Samsung, SRB split and duplication for LTE-NR interworking, 3GPP TSG-RAN WG2 Meeting #98, R2-1705246 mailed May 15-19, 2017. (3 pages).
Huawei, (TP for BL CR for TS 38.423): Support of SN Initiated PDCP Duplication, 3GPP TSG-RAN3 Meeting #101-bis, R3-186172 mailed Oct. 8-12, 2018. (7 pages).
Extended European Search Report for EP Application 18938237.7 dated Oct. 26, 2021. (13 pages).
Spreadtrum Communications, Remaining issues on CA duplication for SRBs, 3GPP TSG-RAN WG2 Meeting #101bis, R2-1804472, Apr. 16-20, 2018. (3 pages).
Communication pursuant to Article 94(3) EPC for EP Application 18938237.7 dated Jun. 10, 2022. (9 pages).
Communication pursuant to Article 94(3) EPC for EP Application 18938237.7 dated May 19, 2023. (6 pages).
Communication pursuant to Article 94(3) EPC for EP Application 18938237.7 dated Nov. 18, 2022. (9 pages).
Chinese First Office Action with English Translation for CN Application 202110808393.9 dated Nov. 18, 2022. (19 pages).
Chinese Second Office Action with English Translation for CN Application 202110808393.9 dated Feb. 5, 2023. (26 pages).
ISR with English Translation issued in corresponding international application No. PCT/CN2018/112771 dated Jul. 30, 2019.
Korean Notice of Preliminary Rejection with English Translation for KR Application 1020217015201 dated Feb. 19, 2024. (9 pages).

* cited by examiner

DUPLICATED DATA-BASED TRANSMISSION METHOD AND RELATED DEVICES

CROSS-REFERENCE TO RELATED APPLICATION(S)

This application is a continuation of International Application No. PCT/CN2018/112771, filed on Oct. 30, 2018, the disclosure of which is hereby incorporated by reference in its entirety.

TECHNICAL FIELD

This disclosure relates to the field of communication technology, and more particularly to a duplicated data-based transmission method and related devices.

BACKGROUND

In a dual connectivity (DC) scenario, multiple network nodes, such as a master eNB (MN) and a secondary eNB (SN), can serve a terminal device. Duplicated data can be transmitted between the multiple network nodes and the terminal device.

In a carrier aggregation (CA) scenario, packet data convergence protocol (PDCP) can duplicate a PDCP protocol data unit (PDU) into two identical ones, which are to be mapped respectively onto different radio link control (RLC) entities and then mapped, via a media access control (MAC) entity, onto two physical carriers, thereby achieving frequency diversity gain and thus improving reliability of data transmission.

How to make full use of duplicated data under both a DC scenario and a CA scenario to achieve a higher resource utilization rate and reliability is a problem to be solved.

SUMMARY

In a first aspect, a duplicated data-based transmission method is provided. The method includes the following. A second communication device sends first information to a first communication device, where the first information is used for determining, by the first communication device, information of at least three RLC entities corresponding to a PDCP entity.

In a second aspect, a communication device is provided. The communication device is a first communication device and includes a receiver. The receiver is configured to receive first information sent by a second communication device, wherein the first information is used for determining information of at least three radio link control (RLC) entities corresponding to a packet data convergence protocol (PDCP) entity.

In a third aspect, a communication device is provided. The communication device is a second communication device and includes a transmitter. The transmitter is configured to send first information to a first communication device, wherein the first information is used for determining, by the first communication device, information of at least three radio link control (RLC) entities corresponding to a packet data convergence protocol (PDCP) entity.

DETAILED DESCRIPTION

The following will describe technical solutions of implementations with reference to the accompanying drawings.

The technical solutions of implementations are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a future $5^{th}$ generation (5G) system (also referred to as a new radio (NR) system).

A network device or a network node of implementations can provide a communication coverage for a specific geographical area and communicate with terminal devices (such as user equipments (UE)) in the coverage area. The network device may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a relay station, an access point, an in-vehicle device, a wearable device, a network-side device in a future 5G network, or a network device in a future evolved public land mobile network (PLMN).

A terminal device of implementations may be mobile or fixed. The terminal device may refer to an access terminal, a UE, a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a future 5G network, a terminal device in a future evolved PLMN, etc.

Figure 1:
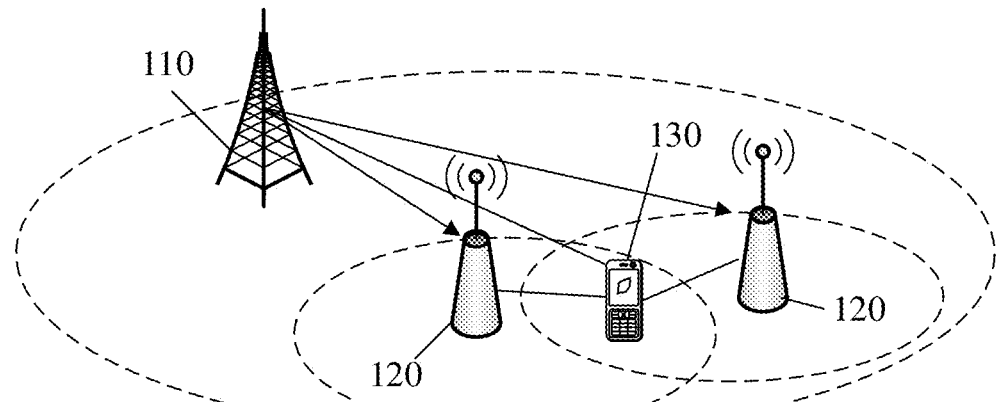
FIG. 1 is a schematic diagram of a multi-connectivity scenario.

In a DC scenario, the terminal device can be served by multiple cell groups (CG). The multiple CGs may include, for example, a master CG (MCG) or a secondary CG (SCG) (also referred to as an MN or an SN respectively). As illustrated in FIG. 1, network devices around a terminal device 130 include an MN 110 and at least one SN 120. The at least one SN 120 is respectively connected with the MN 110 to form a multi-connectivity, and is respectively connected with the terminal device 130 to provide services for the terminal device 130.

The MN 110 may be an LTE network, and the at least one SN 120 may be an NR network. Alternatively, the MN 110 may be an NR network, and the at least one SN 120 may be an LTE network. Alternatively, the MN 110 and the at least one SN 120 are both NR networks. In addition, the MN may be a BTS in a GSM or in a CDMA system, and the at least one SN may also be a BTS in a GSM or in a CDMA system. The disclosure is not limited in this regard.

The terminal device 130 may simultaneously establish connections with the MN 110 and the at least one SN 120. The connection established between the terminal device 130 and the MN 110 is a primary connection, and the connection established between the terminal device 130 and the at least one SN 120 is a secondary connection. Control signaling of the terminal device 130 may be transmitted through the primary connection, and data of the terminal device may be transmitted simultaneously through the primary connection and the secondary connection, or may be transmitted through the secondary connection only.

Figure 2:
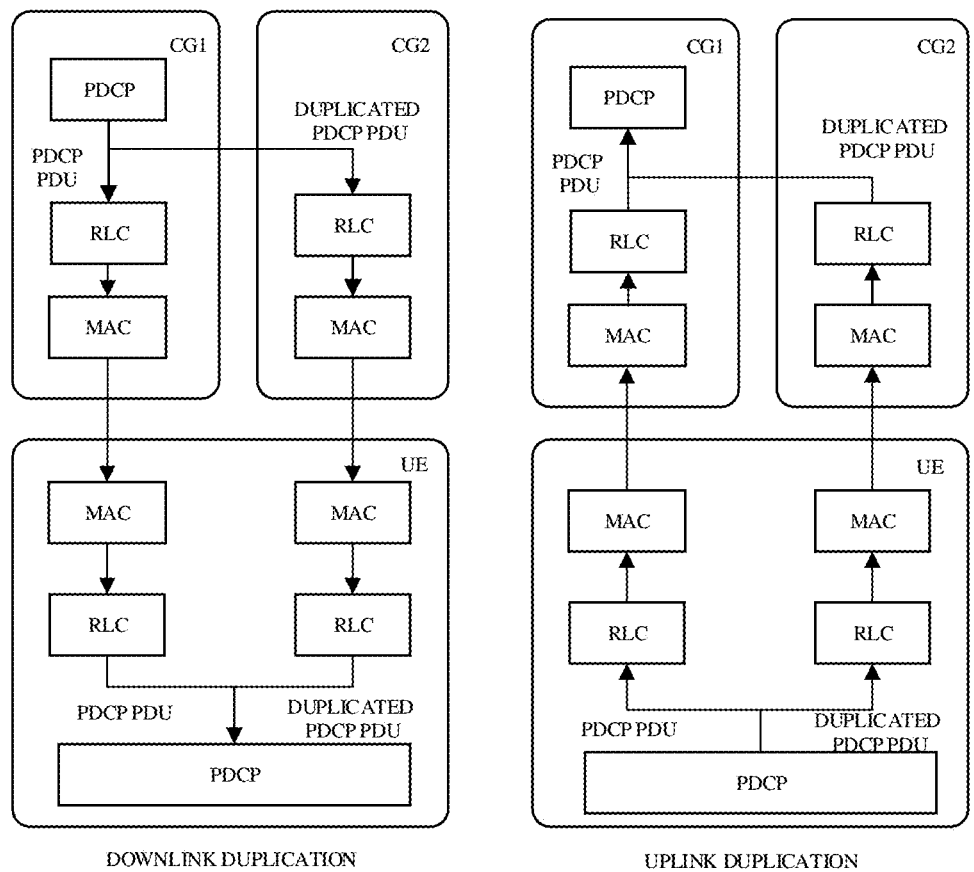
FIG. 2 is a schematic architecture diagram illustrating transmission of duplicated data in a DC scenario.

Duplicated data can be transmitted between the terminal device and the MN and/or the SN. Transmission of duplicated data complies with a split bearer-based protocol architecture. For example, as illustrated in FIG. 2, a PDCP layer is located in a certain CG (for example, an MCG or an SCG). Taking downlink as an example, in any CG, the PDCP layer duplicates a PDCP PDU into two identical copies, for example, one is PDCP PDU and the other one is duplicated PDCP PDU. The two PDCP PDUs each pass through an RLC layer and a MAC layer of different CGs, then reach a corresponding MAC layer and a corresponding RLC layer of the terminal device (downlink) or a base station (uplink) through an air interface, and finally converge to a PDCP layer.

Figure 3:
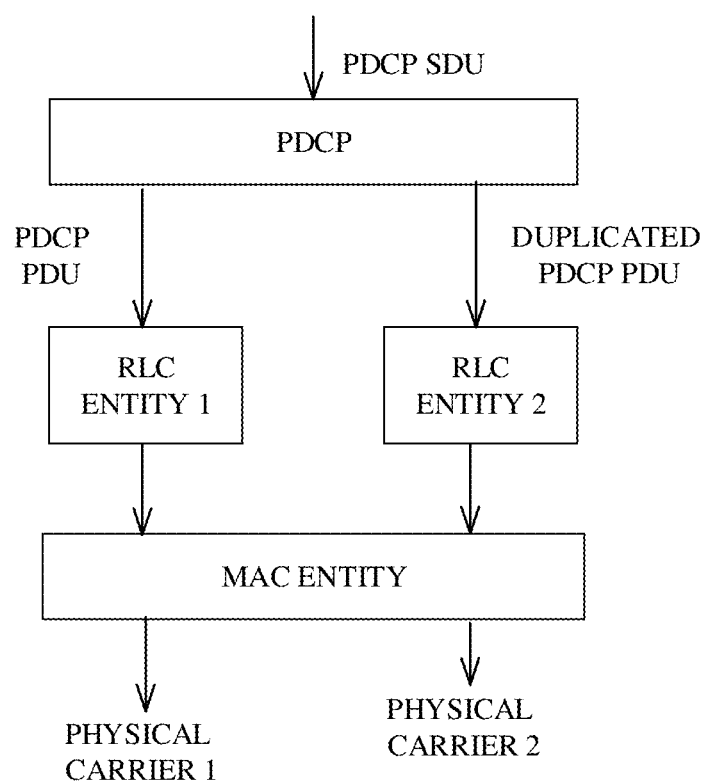
FIG. 3 is a schematic architecture diagram illustrating transmission of duplicated data in a CA scenario.

In a CA scenario, as illustrated in FIG. 3, for example, a PDCP entity may duplicate a PDCP PDU into two identical copies, which are to be mapped respectively onto different RLC entities and then mapped, via a MAC entity, onto two physical carriers, thus achieving frequency diversity gain to improve reliability of data transmission.

Figure 4:
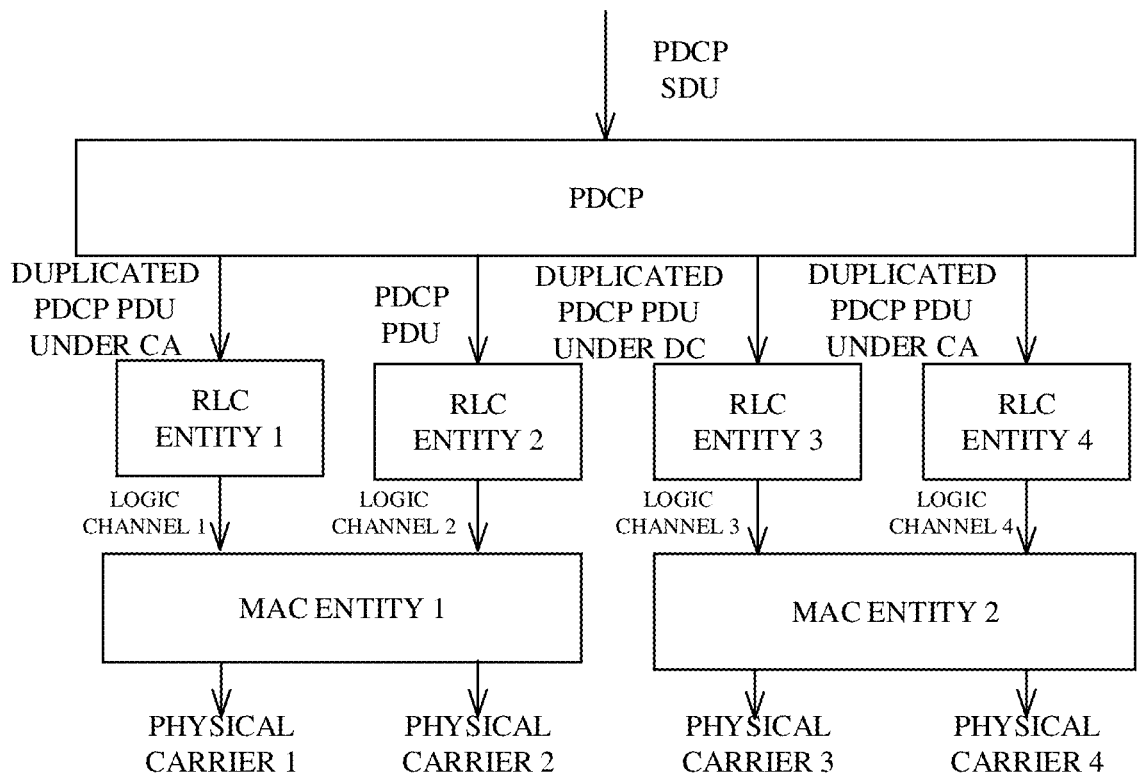
FIG. 4 is a schematic architecture diagram illustrating transmission of duplicated data under both DC and CA according to implementations.

In order to make full use of duplicated data under both DC and CA to achieve a higher resource utilization rate and reliability of data transmission, according to implementations, duplicated data in a DC scenario and duplicated data in a CA scenario can be combined to introduce a mechanism in which there are more than two copies of duplicated data. For example, as illustrated in FIG. 4, a PDCP entity corresponds to four RLC entities, where each of the four RLC entities corresponds to one logic channel. PDCP PDUs obtained based on a PDCP service data unit (SDU) can be transmitted through four logic channels, where logic channel 2 is used for transmitting a PDCP PDU, logic channel 3 is used for transmitting a duplicated PDCP PDU in a DC scenario, logic channel 1 is used for transmitting a duplicated PDCP PDU in a CA scenario, and logic channel 4 is used for transmitting a duplicated PDCP PDU in a CA scenario. Logic channel 1 and logic channel 2 are logic channels of an MN, and logic channel 3 and logic channel 4 are logic channels of an SN. The duplicated PDCP PDU transmitted through logic channel 1 and the PDCP PDU transmitted through logic channel 2 are mapped respectively onto physical carrier 1 and physical carrier 2 via MAC entity 1, and the duplicated PDCP PDU transmitted through logic channel 3 and the duplicated PDCP PDU transmitted through logic channel 4 are mapped respectively onto physical carrier 3 and physical carrier 4 via MAC entity 2. As such, the PDCP PDU and the duplicated PDCP PDUs can be transmitted on four physical carriers, which is conducive to a higher resource utilization rate and reliability of data transmission.

Figure 5:
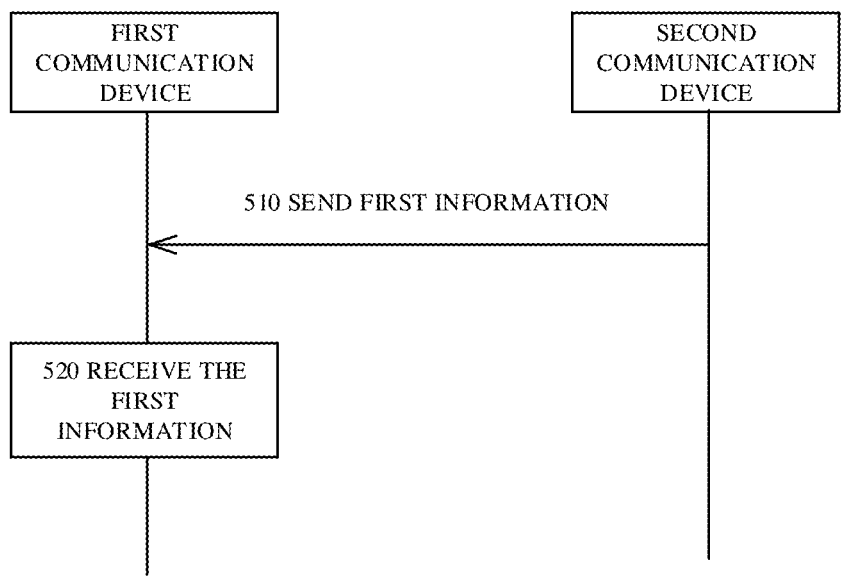
FIG. 5 is an interaction diagram of a duplicated data-based transmission method according to implementations.

FIG. 5 is an interaction diagram of a duplicated data-based transmission method according to implementations. The method is applicable to a scenario where there are more than two copies of duplicated PDCP data packets, for example, a scenario where there are duplicated data under both DC and CA. The method can be performed by a first communication device and a second communication device. The first communication device may be, for example, an MN or an SN. The second communication device may be, for example, an MN, an SN, a core network device, a terminal device, etc. As illustrated in FIG. 5, the method includes the following.

At block 510, the second communication device sends first information to the first communication device.

At block 520, the first communication device receives the first information from the second communication device.

The first information is used for determining information of at least three RLC entities corresponding to a PDCP entity.

In a scenario where there are more than two copies of duplicated PDCP data, for example, a scenario where there are duplicated data under both DC and CA, in addition to cooperatively providing services for a terminal device, different eNBs can each map data onto different physical carriers for transmission. The second communication device sends the first information to the first communication device, such that the first communication device can determine, according to the first information, RLC entities corresponding to the PDCP entity, where one PDCP entity corresponds to at least three RLC entities, which is possible to increase a resource utilization rate and reliability of data transmission.

In other words, at least one of an MN and an SN(s) for transmitting duplicated data under a DC scenario is required to transmit duplicated data under a CA scenario. The base station configured to transmit duplicated data under the CA scenario needs to map data onto at least two physical carriers via at least two RLC entities.

In some implementations, the first information includes, for example, at least one of: cell channel quality information, cell load information, information of a service to-be-transmitted, clock synchronization information, resource scheduling and configuration information, and cell interference information.

In some implementations, the cell channel quality information includes, for example, a reference signal received power (RSRP) or a reference signal received quality (RSRQ).

In some implementations, the information of the service to-be-transmitted includes, for example, at least one of: a period for triggering the service, a service packet size, a time offset of an arrival time point of the service within one period relative to a starting time point of the period, an arrival time window of the service within one period, a transmission time window of the service within one period, a service tolerance delay, information of a recommended cell, and the like.

The clock synchronization information may be, for example, clock synchronization accuracy, global positioning system (GPS) time information, or time advance (TA) information.

The resource scheduling and configuration information may include, for example, a time-frequency resource or channel resource that has been scheduled or occupied, or an idle time-frequency resource or channel resource.

The first communication device can select, according to the above information reported by the second communication device, RLC entities corresponding to the PDCP entity. Since a DC scenario and a CA scenario are introduced for transmission of duplicated data, one PDCP entity can correspond to at least three RLC entities.

In some implementations, the information of the at least three RLC entities corresponding to the PDCP entity includes at least one of: the number of the at least three RLC entities, a logic channel identifier (LCID) of each RLC entity, and whether each RLC entity is currently used for transmitting data which come from the PDCP entity.

The phrase "RLC entities corresponding to the PDCP entity" may be comprehended as "RLC entities currently configured for the PDCP entity". When RLC entity reconfiguration occurs, the RLC entities corresponding to the PDCP entity may change, such as change in the number of the RLC entities corresponding to the PDCP entity and/or change in an LCID of the RLC entity corresponding to the PDCP entity. Here, each RLC entity corresponds to one logic channel, and each logic channel has a unique ID (that is, LCID).

As an example, the first communication device can determine, according to the first information, the number of the at least three RLC entities corresponding to the PDCP entity, that is, determine the number of RLC entities configured for the PDCP entity. For example, the second communication device reports a link condition, a load status, signal quality information, cell interference information, resource scheduling and configuration information, and the like, of a cell corresponding to the second communication device. The first communication device determines comprehensively the number of RLC entities configured for the PDCP entity, according to the above information reported by the second communication device and a link condition, a load status, signal quality information, cell interference information, and the like of a cell covered by the first communication device. For instance, if the link condition is good, more RLC entities can be configured. If cell service load is heavy, fewer RLC entities can be configured. If historical data indicate a high link reliability, more RLC entities can be configured.

In addition, the first communication device can determine the LCID corresponding to each of the at least three RLC entities corresponding to the PDCP entity, according to the first information reported by the second communication device and the link condition, the load status, the signal quality information, the cell interference information, and the like of the cell covered by the first communication device. For example, if a link of the cell is low in quality, the RLC entity on a carrier corresponding to the link will not be configured for the PDCP entity. If there is high interference on a link of the cell, the RLC entity on a carrier corresponding to the link will not be configured for the PDCP entity. If some resource blocks (RB) have been configured for transmitting other information, the RLC entity corresponding to the RB will not be configured for the PDCP entity.

Furthermore, the first communication device can further determine an activated state and/or a deactivated state of each of the at least three RLC entities selected, that is, determine whether each of the at least three RLC entities is currently used for transmitting data which come from the PDCP entity, according to the first information reported by the second communication device and the link condition, the load status, the signal quality information, the cell interference information, and the like, of the cell covered by the first communication device. Among the at least three RLC entities configured, an RLC entity that has been activated can be used for transmitting current data.

As another example, the first communication device can further configure, according to the first information reported by the second communication device and the link condition, the load status, the signal quality information, the cell interference information, and the like, of the cell covered by the first communication device, the maximum number of RLC entities that can be supported. For example, the maximum number of RLC entities that can be supported is four. Then according to the link condition, the load status, the signal quality information, the cell interference information, resource scheduling and configuration information, link reliability, etc. of the cell covered by the first communication device, the first communication device selects at least three RLC entities among the four RLC entities and determines an activated state and/or a deactivated state of each of the at least three RLC entities selected (that is, determine whether each of the at least three RLC entities is currently used for transmitting data which come from the PDCP entity). Among the at least three RLC entities, an RLC entity that has been activated can be used for transmitting current data.

According to implementations, there can be three cases in terms of the type of each of the first communication device and the second communication device, which will be hereinafter described.

Case 1

The first communication device is an MN, and the second communication device is an SN. Alternatively, the first communication device is the SN, and the second communication device is the MN.

In other words, the first information is interchanged between the MN and the SN.

In some implementations, the method further includes the following. The first communication device sends second information to the second communication device, where the second information is used for instructing the second communication device to send the first information to the first communication device.

Accordingly, in some implementations, the method further includes the following. The second communication device receives the second information from the first communication device, where the second information is used for instructing the second communication device to send the first information to the first communication device. The second communication device sends the first information to the first communication device at block 510 as follows. The second communication device sends the first information to the first communication device according to the second information.

For example, the MN sends the second information to the SN, to instruct the SN to report a link condition, a load status, signal quality information, cell interference information, and the like of a cell corresponding to the SN. The SN, upon receiving the second information, obtains first information of a cell covered by the SN to be reported to the MN. As such, the MN configures, according to the information received, RLC entities corresponding to the PDCP entity.

Case 2

The first communication device is an MN or an SN, and the second communication device is a core network (CN) device.

In other words, the first information can be interchanged not only between the MN and the SN, but also between the MN and a core network or between the SN and a core network.

In some implementations, the method further includes the following. The first communication device sends second information to the second communication device, where the second information is used for instructing the second communication device to send the first information to the first communication device.

Accordingly, in some implementations, the method further includes the following. The second communication device receives the second information from the first communication device, where the second information is used for instructing the second communication device to send the first information to the first communication device. The second communication device sends the first information to the first communication device at block 510 as follows. The second communication device sends the first information to the first communication device according to the second information.

For example, the MN sends the second information to the core network, to instruct the core network to report a link condition, a load status, signal quality information, cell interference information, a service status, and the like of a cell corresponding to the SN. The core network, upon receiving the second information, acquires from the SN the first information to be reported to the MN, and/or reports first information stored in the core network to the MN. As such, the MN configures, according to the information received, RLC entities corresponding to the PDCP entity.

Case 3

The first communication device is an MN or an SN, and the second communication device is a terminal device.

In other words, the first information can be interchanged not only between network devices, but also between a network device and the terminal device.

In some implementations, the method includes the following. The first communication device sends third information to the terminal device, where the third information is used for instructing the terminal device to send the first information to the first communication device.

Accordingly, in some implementations, the method further includes the following. The terminal device receives the third information from the first communication device, where the third information is used for instructing the terminal device to send the first information to the first communication device. The terminal device sends the first information to the first communication device at block 510 as follows. The terminal device obtains the first information according to the third information and sends the first information to the first communication device.

For example, the MN sends the third information to the terminal device, to instruct the terminal device to report a link condition, a load status, signal quality information, cell interference information, and the like of a cell which serves the terminal device. The terminal device, upon receiving the third information, measures to obtain the first information to be reported to the MN. The MN configures, according to the information received, RLC entities corresponding to the PDCP entity. The first information reported by the terminal device may include first information of a cell covered by the MN and/or first information of a cell covered by the SN.

In some implementations, the third information includes, for example, at least one of: information of a cell to be measured by the terminal device, information of a frequency to be measured by the terminal device, a triggering event for triggering the terminal device to measure, a reference signal to be measured by the terminal device, a condition that should be satisfied for the terminal device to report the first information, and a period at which the terminal device reports the first information.

The third information can be used for measuring, by the terminal device, a cell serving the terminal device in terms of the first information. For example, the MN or SN can send to the terminal device a list of cells to be measured or a list of frequencies to be measured. The terminal device can measure the cells or frequencies in the list in terms of signal quality or power. For another example, the MN or SN can send to the terminal device the triggering event for triggering the terminal device to measure. When the triggering event occurs, for example, when the RSRP exceeds a threshold value, the terminal device makes measurement. For another example, the MN or SN can instruct to the terminal device what to be measured, for example, instruct the terminal device to measure one or more of cell channel quality, cell load, a service to-be-transmitted, and cell interference. For another example, the MN or SN can instruct to the terminal device a condition that should be satisfied for the terminal device to report, for example, when a measurement value exceeds a threshold value. As such, the terminal device reports the measurement result only when the measurement value exceeds the threshold value. For another example, the MN or SN can instruct to the terminal device a period for reporting, such that the terminal device can report periodically.

In some implementations, the first communication device sends the third information to the terminal device as follows. The first communication device sends to the terminal device radio resource control (RRC) signaling carrying the third information.

In some implementations, the first communication device receives the first information from the second communication device at block 510 as follows. The first communication device receives from the terminal device RRC signaling carrying the first information.

It should be noted that, under the condition of no conflict, various implementations described herein and/or technical features in the various implementations can be arbitrarily combined, and the technical solutions thus obtained shall also fall within the protection scope of the disclosure.

It should be understood that, in the various implementations described herein, the sequence number of each of various processes described above does not mean the order of execution. The execution order of each process should be determined by its function and internal logic and should not constitute any limitation on the implementation process of the implementations.

The duplicated data-based transmission method of implementations has been elaborated above. The following will describe related devices of implementations in connection with FIG. 6 to FIG. 8. Technical features described in the foregoing method implementations are also applicable to the following device/apparatus implementations.

Figure 6:
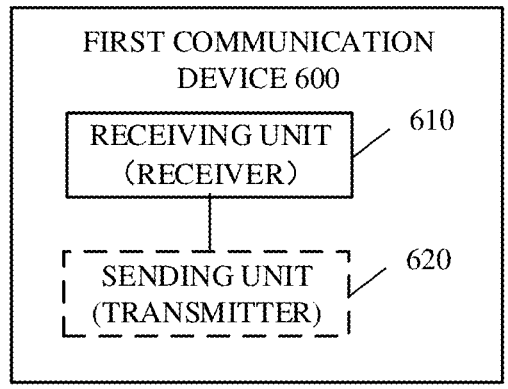
FIG. 6 is a schematic block diagram of a first communication device according to implementations.

FIG. 6 is a schematic block diagram of a communication device according to implementations. The communication device is a first communication device 600. The first communication device 600 or functional modules thereof can perform the method described with reference to FIG. 5 or perform any one of the implementations of the method described with reference to FIG. 5, specifically, perform the operations done at the first communication device. As illustrated in FIG. 6, the first communication device 600 includes a receiving unit 610. The receiving unit 610 is configured to receive first information sent by a second communication device, where the first information is used for determining information of at least three RLC entities corresponding to a PDCP entity.

Therefore, in a scenario where there are duplicated data under both DC and CA, in addition to cooperatively providing services for a terminal device, different eNBs can each map data onto different physical carriers for transmission. The first communication device can determine, according to the first information reported by the second communication device, RLC entities corresponding to the PDCP entity, where one PDCP entity corresponds to at least three RLC entities, which is possible to increase a resource utilization rate and reliability of data transmission.

In some implementations, the first communication device is applicable a scenario where there are more than two copies of duplicated PDCP data packets, or a scenario where there are duplicated data under both DC and CA.

In some implementations, the information of the at least three RLC entities corresponding to the PDCP entity includes at least one of: the number of the at least three RLC entities, an LCID corresponding to each of the at least three RLC entities, and whether each of the at least three RLC entities is currently used for transmitting data which come from the PDCP entity.

In some implementations, the first information includes at least one of: cell channel quality information, cell load information, information of a service to-be-transmitted, clock synchronization information, resource scheduling and configuration information, and cell interference information.

In some implementations, the cell channel quality information includes one of an RSRP and an RSRQ.

In some implementations, the information of the service to-be-transmitted includes at least one of: a period for triggering the service, a service packet size, a time offset of an arrival time point of the service within one period relative to a starting time point of the period, an arrival time window of the service within one period, a transmission time window of the service within one period, and a service tolerance delay.

In some implementations, the first communication device is an MN, and the second communication device is an SN. Alternatively, the first communication device is the SN, and the second communication device is the MN.

In some implementations, the first communication device is an MN or an SN, and the second communication device is a core network device.

In some implementations, the first communication device further includes a sending unit 620. The sending unit 620 is configured to send second information to the second communication device, where the second information is used for instructing the second communication device to send the first information to the first communication device.

In some implementations, the first communication device is an MN or an SN, and the second communication device is a terminal device.

In some implementations, the first communication device further includes a sending unit 620. The sending unit 620 is configured to send third information to the terminal device, where the third information is used for instructing the terminal device to send the first information to the first communication device.

In some implementations, the third information includes at least one of: information of a cell to be measured by the terminal device, information of a frequency to be measured by the terminal device, a triggering event for triggering the terminal device to measure, a reference signal to be measured by the terminal device, a condition that should be satisfied for the terminal device to report the first information, and a period at which the terminal device reports the first information.

In some implementations, the sending unit 620 is configured to send to the terminal device RRC signaling carrying the third information.

In some implementations, the receiving unit 610 is configured to receive from the terminal device RRC signaling carrying the first information.

It should be understood that, the first communication device 600 can perform operations performed by the first communication device in the method 500, which will not be repeated herein for the sake of simplicity.

Figure 7:
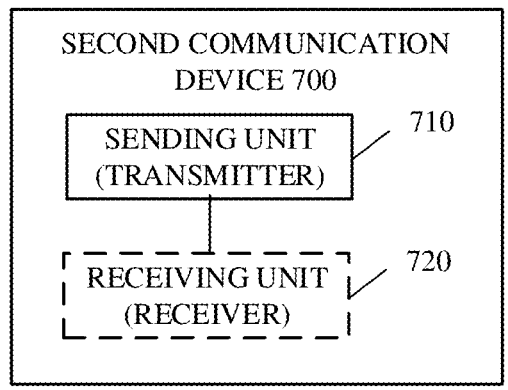
FIG. 7 is a schematic block diagram of a second communication device according to implementations.

FIG. 7 is a schematic block diagram of a communication device according to implementations. The communication device is a second communication device 700. The second communication device 700 or functional modules thereof can perform the method described with reference to FIG. 5 or perform any one of the implementations of the method described with reference to FIG. 5, specifically, perform the operations done at the second communication device. As illustrated in FIG. 7, the second communication device 700 includes a sending unit 710. The sending unit 710 is configured to send first information to a first communication device, where the first information is used for determining, by the first communication device, information of at least three RLC entities corresponding to a PDCP entity.

Therefore, in a scenario where there are duplicated data under both DC and CA, in addition to cooperatively providing services for a terminal device, different eNBs can each map data onto different physical carriers for transmission. The first communication device can determine, according to the first information reported by the second communication device, RLC entities corresponding to the PDCP entity, where one PDCP entity corresponds to at least three RLC entities, which is possible to increase a resource utilization rate and reliability of data transmission.

In some implementations, the second communication device is applicable to a scenario where there are more than two copies of duplicated PDCP data packets, or a scenario where there are duplicated data under both DC and CA.

In some implementations, the information of the at least three RLC entities corresponding to the PDCP entity includes at least one of: the number of the at least three RLC entities, an LCID corresponding to each of the at least three RLC entities, and whether each of the at least three RLC entities is currently used for transmitting data which come from the PDCP entity.

In some implementations, the first information includes at least one of: cell channel quality information, cell load information, information of a service to-be-transmitted, clock synchronization information, resource scheduling and configuration information, and cell interference information.

In some implementations, the cell channel quality information includes one of an RSRP and an RSRQ.

In some implementations, the information of the service to-be-transmitted includes at least one of: a period for triggering the service, a service packet size, a time offset of an arrival time point of the service within one period relative to a starting time point of the period, an arrival time window of the service within one period, a transmission time window of the service within one period, and a service tolerance delay.

In some implementations, the first communication device is an MN, and the second communication device is an SN. Alternatively, the first communication device is the SN, and the second communication device is the MN.

In some implementations, the first communication device is an MN or an SN, and the second communication device is a core network device.

In some implementations, the second communication device further includes a receiving unit 720. The receiving unit 720 is configured to receive second information sent by the first communication device, where the second information is used for instructing the second communication device to send the first information to the first communication device. The sending unit 710 is configured to send, by the second communication device, the first information to the first communication device according to the second information.

In some implementations, the first communication device is an MN or an SN, and the second communication device is a terminal device.

In some implementations, the second communication device further includes a receiving unit 720 and a processing unit. The receiving unit 720 is configured to receive third information sent by the first communication device, where the third information is used for instructing the second communication device to send the first information to the first communication device. The processing unit is configured to obtain the first information according to the third information. The sending unit 710 is configured to send the first information to the first communication device.

In some implementations, the third information includes at least one of: information of a cell to be measured by the terminal device, information of a frequency to be measured by the terminal device, a triggering event for triggering the terminal device to measure, a reference signal to be measured by the terminal device, a condition that should be satisfied for the terminal device to report the first information, and a period at which the terminal device reports the first information.

In some implementations, the receiving unit 720 is configured to receive from the first communication device RRC signaling carrying the third information.

In some implementations, the sending unit 710 is configured to send to the first communication device RRC signaling carrying the first information.

It should be understood that, the second communication device 700 can perform operations performed by the second communication device in the method 500, which will not be repeated herein for the sake of simplicity.

The sending units 610 and 720 described above can be implemented as a transmitter respectively. The receiving units 620 and 720 described above can be implemented as a receiver respectively. For example, the transmitter can be a transmitting antenna, and the receiver can be a receiving antenna. Still possibly, the transmitter and the receiver can be integrated into a transceiver.

Figure 8:
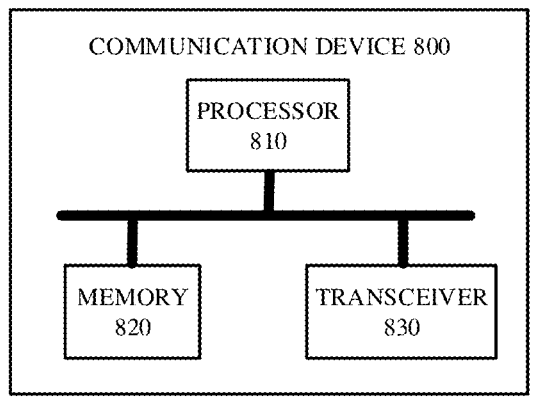
FIG. 8 is a schematic structural diagram of a communication device according to implementations.

FIG. 8 is a schematic structural diagram of a communication device 800 according to implementations. As illustrated in FIG. 8, the communication device 800 includes a processor 810. The processor 810 can invoke and execute computer programs stored in a memory to perform the method provided in implementations.

As illustrated in FIG. 8, the communication device 800 can further include the memory 820. The processor 810 can invoke and execute the computer programs stored in the memory 820 to perform the method provided in implementations.

The memory 820 may be a separate device independent of the processor 810, or may be integrated into the processor 810.

As illustrated in FIG. 8, the communication device 800 can further include a transceiver 830. The processor 810 can control the transceiver 830 to communicate with other devices, for example, to send information or data to other devices, or to receive information or data from other devices.

The transceiver 830 may include a transmitter and a receiver. The transceiver 830 may further include an antenna, where one or more antennas can be provided.

The communication device 800 may be the first communication device of implementations, and the communication device 800 can implement the operations performed by the first communication device described in the foregoing method implementations, which will not be repeated herein for the sake of simplicity.

Alternatively, the communication device 800 may be the second communication device of implementations, and the communication device 800 can implement the operations performed by the second communication device described in the foregoing method implementations, which will not be repeated herein for the sake of simplicity.

Figure 9:
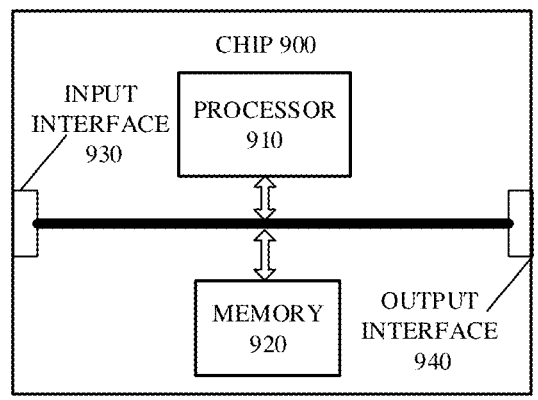
FIG. 9 is a schematic structural diagram of a chip according to implementations.

FIG. 9 is a schematic structural diagram of a chip according to implementations. As illustrated in FIG. 9, the chip 900 includes a processor 910. The processor 910 is configured to invoke and execute computer programs stored in a memory to perform the method provided in implementations.

As illustrated in FIG. 9, the chip 900 further includes the memory 920. The processor 910 can invoke and execute the computer programs stored in the memory 920 to perform the method provided in implementations.

The memory 920 may be a separate device independent of the processor 910, or may be integrated into the processor 910.

The chip 900 may further include an input interface 930. The processor 910 can control the input interface 930 to communicate with other devices or chips, for example, to acquire information or data sent by other devices or chips.

The chip 900 may further include an output interface 940. The processor 910 can control the output interface 940 to communicate with other devices or chips, for example, to output information or data to other devices or chips.

The chip is applicable to the first communication device of implementations. The chip can implement the operations performed by the first communication device described in the foregoing method implementations, which will not be repeated herein for the sake of simplicity.

Alternatively, the chip is applicable to the second communication device of implementations. The chip can implement the operations performed by the second communication device described in the foregoing method implementations, which will not be repeated herein for the sake of simplicity.

It should be understood that, the chip herein may also be referred to as a system-on-chip (SOC).

The processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random-access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to implementations may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or a flash memory. The volatile memory can be a RAM that acts as an external cache. By way of explanation rather than limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchronous link dynamic random-access memory (synch-link DRAM, SLDRAM), and a direct rambus RAM (DRRAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Figure 10:
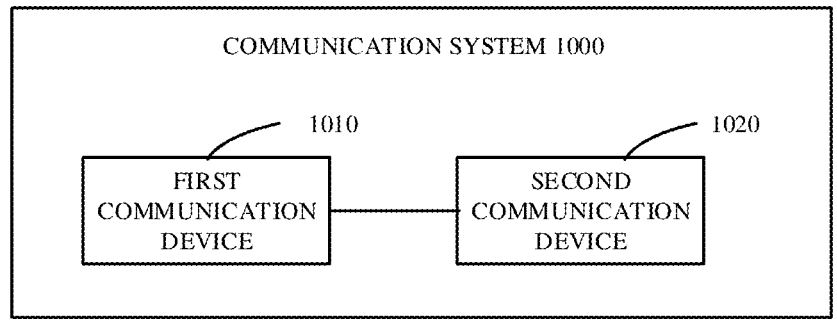
FIG. 10 is a schematic block diagram of a communication system according to implementations.

FIG. 10 is a schematic block diagram of a communication system 1000 according to implementations. As illustrated in FIG. 10, the communication system 1000 includes a first communication device 1010 and a second communication device 1020.

The second communication device 1020 is configured to send first information to the first communication device, where the first information is used for determining, by the first communication device, information of at least three RLC entities corresponding to a PDCP entity.

The first communication device 1010 is configured to receive the first information sent by the second communication device, where the first information is used for determining information of at least three RLC entities corresponding to a PDCP entity.

The first communication device 1010 can implement functions of the method 500 which are implemented by a first communication device. The first communication device 1010 may be structured like the first communication device 600 illustrated in FIG. 6, which will not be repeated herein for the sake of simplicity.

The second communication device 1020 can implement functions of the method 500 which are implemented by a second communication device. The second communication device 1020 may be structured like the second communication device 700 illustrated in FIG. 7, which will not be repeated herein for the sake of simplicity.

Implementations further provide a computer readable storage medium. The computer readable storage medium is configured to store computer programs. The computer readable storage medium is applicable to the first communication device of implementations. The computer programs are operable with a computer to implement the operations performed by the first communication device described in the foregoing method implementations, which will not be repeated herein for the sake of simplicity. Alternatively, the computer readable storage medium is applicable to the second communication device of implementations. The computer programs are operable with a computer to implement the operations performed by the second communication device described in the foregoing method implementations, which will not be repeated herein for the sake of simplicity.

Implementations further provide a computer program product. The computer program product includes computer program instructions. The computer program product is applicable to the first communication device of implementations. The computer program instructions are operable with a computer to implement the operations performed by the first communication device described in the foregoing method implementations, which will not be repeated herein for the sake of simplicity. Alternatively, the computer program product is applicable to the second communication device of implementations. The computer program instructions are operable with a computer to implement the operations performed by the second communication device described in the foregoing method implementations, which will not be repeated herein for the sake of simplicity.

Implementations further provide a computer program. The computer program is applicable to the first communication device of implementations. The computer program, when executed by a computer, is operable with the computer to implement the operations performed by the first communication device described in the foregoing method implementations, which will not be repeated herein for the sake of simplicity. Alternatively, the computer program is applicable to the second communication device of implementations. The computer program, when executed by a computer, is operable with the computer to implement the operations performed by the second communication device described in the foregoing method implementations, which will not be repeated herein for the sake of simplicity.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In addition, according to implementations, "B corresponding to A" means that B is associated with A, and B can be determined according to A. However, the phrase "B can be determined according to A" does not mean that B is determined only according to A, and B can also be determined according to A and/or other information.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods for each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for duplicated data-based transmission, comprising:
   receiving, by a first communication device, first information sent by a second communication device, wherein the first information is used for determining information of at least three radio link control (RLC) entities corresponding to a packet data convergence protocol (PDCP) entity, and wherein:
   the first communication device is a master eNB (MN), and the second communication device is a secondary eNB (SN); or
   the first communication device is the SN, and the second communication device is the MN; or
   the first communication device is one of an MN or an SN, and the second communication device is a core network device.

2. The method of claim 1, being applicable to one of:
   a scenario where there are more than two copies of duplicated PDCP data packets; or
   a scenario where there are duplicated data under both dual connectivity (DC) and carrier aggregation (CA).

3. The method of claim 1, wherein the information of the at least three RLC entities corresponding to the PDCP entity comprises at least one of:
   the number of the at least three RLC entities;
   a logic channel identifier (LCID) corresponding to each of the at least three RLC entities; or
   whether each of the at least three RLC entities is currently used for transmitting data which come from the PDCP entity.

4. The method of claim 1, wherein the first information comprises at least one of: cell channel quality information, cell load information, information of a service to-be-transmitted, clock synchronization information, resource scheduling and configuration information, or cell interference information.

5. The method of claim 4, wherein the cell channel quality information comprises one of a reference signal received power (RSRP) or a reference signal received quality (RSRQ).

6. The method of claim 4, wherein the information of the service to-be-transmitted comprises at least one of: a period for triggering the service, a service packet size, a time offset of an arrival time point of the service within one period relative to a starting time point of the period, an arrival time window of the service within one period, a transmission time window of the service within one period, or a service tolerance delay.

7. A communication device being a first communication device and comprising:
   a receiver configured to receive first information sent by a second communication device, wherein the first information is used for determining information of at least three radio link control (RLC) entities corresponding to a packet data convergence protocol (PDCP) entity, and wherein
   the first communication device is a master eNB (MN), and the second communication device is a secondary eNB (SN); or
   the first communication device is the SN, and the second communication device is the MN; or
   the first communication device is one of an MN or an SN, and the second communication device is a core network device.

8. The communication device of claim 7, wherein the information of the at least three RLC entities corresponding to the PDCP entity comprises at least one of:
- the number of the at least three RLC entities;
- a logic channel identifier (LCID) corresponding to each of the at least three RLC entities; or
- whether each of the at least three RLC entities is currently used for transmitting data which come from the PDCP entity.

9. The communication device of claim 7, wherein the first communication device further comprises:
- a transmitter configured to send second information to the second communication device, wherein the second information is used for instructing the second communication device to send the first information to the first communication device.

10. A communication device being a second communication device and comprising:
- a transmitter configured to send first information to a first communication device, wherein the first information is used for determining, by the first communication device, information of at least three radio link control (RLC) entities corresponding to a packet data convergence protocol (PDCP) entity, and wherein
- the first communication device is a master eNB (MN), and the second communication device is a secondary eNB (SN); or
- the first communication device is the SN, and the second communication device is the MN; or
- the first communication device is one of an MN or an SN, and the second communication device is a core network device.

11. The communication device of claim 10, wherein the second communication device is applicable to one of:
- a scenario where there are more than two copies of duplicated PDCP data packets; or
- a scenario where there are duplicated data under both dual connectivity (DC) and carrier aggregation (CA).

12. The communication device of claim 10, wherein the second communication device further comprises:
- a receiver configured to receive second information sent by the first communication device, wherein the second information is used for instructing the second communication device to send the first information to the first communication device, and wherein
- the transmitter is configured to:
  - send the first information to the first communication device according to the second information.

* * * * *